United States Patent [19]
Neilson et al.

[11] 3,955,882
[45] May 11, 1976

[54] OPTICAL ELEMENTS

[75] Inventors: Robert George Tomison Neilson, Melton Mowbray; John Anthony Fawcett, Thrussington, both of England

[73] Assignee: The Rank Organisation Limited, Surrey, England

[22] Filed: July 19, 1972

[21] Appl. No.: 273,292

[30] Foreign Application Priority Data
Aug. 9, 1971 United Kingdom............ 37347/71

[52] U.S. Cl.................................. 350/164; 350/166
[51] Int. Cl.²............................................. G02B 1/10
[58] Field of Search................... 350/164, 165, 166

[56] References Cited
UNITED STATES PATENTS

| | | | |
|---|---|---|---|
| 3,410,626 | 11/1968 | Magrath | 350/317 |
| 3,551,590 | 12/1970 | Boothroyd | 350/164 |
| 3,597,050 | 8/1971 | Plumat | 350/164 |

*Primary Examiner*—Craig E. Church
*Attorney, Agent, or Firm*—Brisebois & Kruger

[57] ABSTRACT

An optical element and a method of forming such an optical element are disclosed. The optical element comprises a base of optically transparent material, a layer or several layers of material having selected physical and optical properties, and a coating integrally formed to the substrate and having substantially the same optical properties as the substrate so that the said layer or layers is or are effectively embedded therein. The layer or layers may be discontinuous e.g. formed as stripes, or patterned and the optical properties may be reflective, transmissive, absorptive, spectrally selective, photo-sensitive, photo-emissive or any combination of these depending on the circumstances. If several layers are provided these may be all identical or one or more may be different, having different optical properties and/or different physical properties of size, shape and pattern.

7 Claims, 6 Drawing Figures

OPTICAL ELEMENTS

The present invention relates to optical elements, and particularly to an optical element of the type having at least one discontinuous or "patterned" layer. The term patterned used herein will be understood to refer to a layer of material having a figured surface or a pattern of apertures capable of modifying light incident on the layer.

According to the present invention an optical element comprises a substrate having at least one discontinuous and/or patterned discrete layer of material deposited thereon, the said layer having different optical properties from the substrate for modifying light incident on the element, said layer being covered by a further, continuous layer of a material whose optical properties substantially match those of the substrate.

The said layer may be discontinuous inasmuch as it is formed as separate elements, for example a layer may comprise substantially parallel strips of dichroic material embedded in the substrate so that the element is in the form of a so-called "striped filter." Alternatively the layer may be continuous but have a plurality of elongate apertures to perform an essentially similar function. On the other hand there may be a plurality of apertures of a relatively small size, or the apertures may be relatively large and the width of the material of the layer between the apertures may be relatively narrow. Various other configurations are possible depending on the operation which is to be performed by the element.

For example, in one embodiment there are provided a plurality of such discontinuous and/or patterned layers displaced from each other by a distance of the same order as the thickness of the layers. In such an embodiment where there are a plurality of layers the discontinuities, apertures or other features of the pattern may overly one another or be displaced from one another, again depending on the function of the element of which they form part.

It will be appreciated that the optical properties of the discontinuous and/or patterned layer or layers may be absorptive, reflective, transmissive, spectrally selective, photo-sensitive, photo-emissive or any combination thereof. In one embodiment the or at least one of the said discontinuous and/or patterned layers comprises a plurality of thin film interference layers. In an embodiment of the invention having a plurality of layers at least one of the said plurality of discontinuous and/or patterned layers may have optical properties different from the other said layers.

Preferably the substrate and said further layer form a substantially optically homogeneous medium. Similarly, it is preferred that the surface of at least part of the further layer is worked to an optical finish such that light is not substantially modified by the interface between the said surface and the adjacent medium.

Embodiments of this invention may be treated as separate optical components and used in optical instruments such as interferometers in a manner which will be discussed below, or may be incorporated in optical apparatus as an integral component thereof.

For example, in applications where it is desired to split an incident beam of white light into various coloured components, such as in a colour television camera, it has previously been the practice to split the incident beam by means of an arrangement of prisms which form, in effect a number of inclined dichroic reflectors. Separate detectors are then used to detect the light of each colour component to provide the information for transmission of a colour television picture. Such an arrangement is, however, both costly and bulky and both of these are preferably to be avoided in colour television cameras. By utilising an embodiment of the present invention in the form of a striped filter comprising a multiple layer element having a number of discontinuous layers of dichroic material in the form of strips, the strips of each layer having different spectral properties it is possible to utilise only one detector, the striped filter replacing the prism arrangement. The optical image of the scene together with the lattice of overlapping stripe patterns would be relayed, by a suitable lens system to the photo-sensitive surface of the detector. It is then possible to obtain the appropriate information for transmission of a colour television picture by suitable electronic processing of the signal from the detector. Alternatively, and preferably, the optical element may be formed as part of the photosensitive end wall of the photo detector. In such an arrangement care must be taken that the plane of the discontinuous and/or patterned layers are parallel to the focal plane of the optical system of which they form part and preferably lie in or near to the said focal plane. By means of the present invention one can ensure that the overall separation between the strip elements and the externally worked surface is within the depth of focus of the optical system. Such a system is a significant improvement over the known arrangement for, in addition to the reduction of cost and bulk, the dichroic strips of the optical element forming an embodiment of this invention receive light at substantially normal incidence thereby overcoming the known difficulty arising in the previously used arrangement using angled dichroic reflectors which are spectrally sensitive to polarisation and field angle.

As mentioned above, embodiments of this invention may be used as separate optical elements in instruments such as interferometers. In such an application an embodiment might, for example, be used for splitting a light beam by the division of the wavefront of an incoming beam. Such instruments are of great value in accurate measurement of the wavelengths of light waves and in the accurate measurement of distance. Division of the wavefront of the beam of light in the instrument may also be used to code the light in different parts of the beam, so permitting much more information to be processed in a given time than would otherwise be possible, the coding permitting many signals produced from the light beam to be handled by detection means which would otherwise handle only one uncoded signal.

A widely used method of dividing the wavefront of a light beam or an instrument of any of these types is to let the beam be incident on a patterned grating or screen, parts of which reflect the light waves and parts of which transmit them. On subsequently combining the beams, a detection means is used which detects the difference in phase of the waves from the reflected and transmitted beams respectively. This phase difference contains the information which it is the purpose of the instrument to detect. It can be seen that if the patterned grating or screen produces unexpected or irregular changes in the phase or wavefront deformation with respect to the phase of the incident waves of either or both reflected or transmitted waves of light, then the retrieval of information is much more difficult, and in fact the scope of the instrument may be severely limited.

Thus an embodiment of the invention may be constructed in the form of a screen or grating to perform the wavefront dividing operation previously performed by known such elements. Gratings or screens of a previously known form may have defects of one of two types, that is defects which either cause the phase change and reflection of the reflected light waves to change with time due, for example, to the slow oxidation of metallic reflection layers where metal reflectors have been used, or that cause the phase change on either reflection by or transmission through the screen or gratings to be different in different regions of the screen or gratings due to imperfections in the smoothness of the structure. An embodiment of the invention constructed as a screen or grating can have, by virtue of the optical finish to the surfaces of the transparent substrate and further layer or coating of the embodiment, and by virtue of the sealing-in and hence protection from oxidation of patterned metal reflectors, phase changes for either reflected or transmitted light waves which are stable in time and are identical in different regions of the grating or screen.

According to another aspect of the invention, a method of manufacturing an optical element of the type described above comprises the steps of working the surface of a substrate to a predetermined optical finish, depositing a discontinuous and/or patterned layer of a material having selected optical properties on the said surface of the substrate, and forming a coating over the said discontinuous and/or patterned layer of a material having substantially the same optical properties as the substrate and having a surface with a given optical finish.

Preferably the coating over the discontinuous and/or patterned layer is formed so as to have substantially the same thickness as the said discontinuous and/or patterned layer. The method may further comprise the steps of depositing at least one further discontinuous and/or patterned layer of optical material having optical properties different from the optical properties of the said substrate, and forming a coating, over the said further discontinuous and/or patterned layer, of a material having substantially the same optical properties as the substrate and having a surface with a given optical finish.

In one embodiment the coating over the discontinuous and/or patterned layer is a different material from that forming the remainder of the substrate.

Two embodiments of the invention will now be more particularly described, by way of example, with reference to the accompanying drawings, in which.

Figure 1:
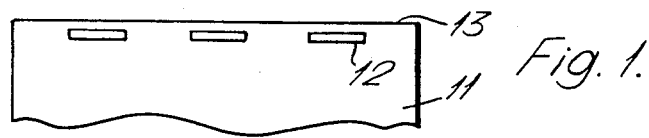
FIG. 1 is a cross sectional view of part of a first embodiment.
Figure 2:
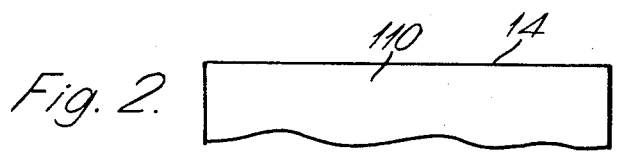
FIGS. 2, 3, 4 and 5 are cross sectional views illustrating various stages in the manufacture of the embodiment of FIG. 1.
Figure 3:
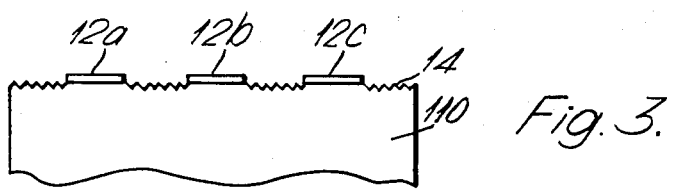

Referring now to FIG. 1 the first embodiment comprises an element 11 of a massive, solid, transparent and essentially homogeneous material, in which there is embedded a layer 12 comprising a plurality of separate thin film strips 12a, 12b and 12c whose optical properties are different from those of the element 11. The layer 12 is embedded in the element 11 such that the planes of the strips of thin film are parallel to an optically worked outermost surface 13 and at a distance of not greater than 10 micro-meters from that surface. If the thin film layer 12 is composed of strips of dichroic film stack as mentioned above, the embodiment of FIG. 1 will, in effect, form a striped filter.

Referring now to FIGS. 2 to 5 the method of manufacture of the embodiment of FIG. 1 is illustrated. The first stage of such manufacture is to work a surface 14 to a desired optical finish on a massive, homogenous, transparent substrate 110. Onto the surface 14 a layer 12 of a thin film coating is deposited (by means which may be conventional) in a pattern which, in this embodiment, is an array of separate strips 12a, 12b etc. The deposition of the layer 12 will, depending on the deposition process used, normally deform the optically worked surface 14 of the substrate 110.

The substrate 110 and the layer 12 is next overcoated with a material 15, such as optical glass or other hard, transparent medium whose optical properties are similar to those of the substrate 110. The overcoating process may be effected, for example, by sputtering or other vacuum deposition technique. During this process the interface between the materials 110 and 15 effectively vanishes due to the similarity of the media 110 and 15 thereby obviating any loss of optical quality due to the surface damage caused by the deposition of the layer 12. If the materials 110 and 15 are different the optical properties of each should nevertheless be selected to be substantially the same so that the interface between them has little or no effect on light transmitted through the element.

Figure 4:
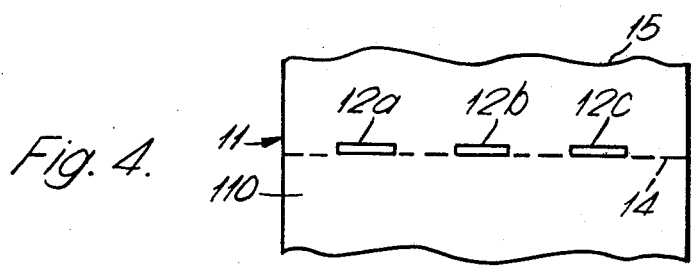
Figure 5:
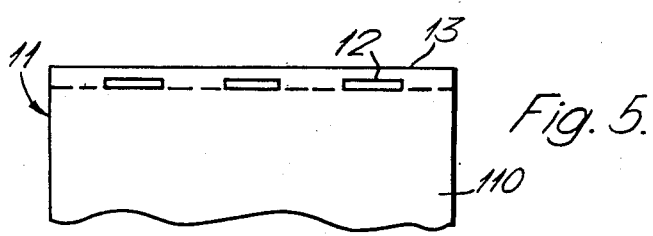

As shown in FIG. 4 the overcoating 15 of the element will, in general, not have a satisfactory optical finish, and the manufacturing is completed by a suitable surface finishing process carried out on the coating 15 which, in addition to figuring the surface to a desired optical quality also ensures that the thickness of the coating 15 is of the same order of magnitude as the thickness of the layer 12 which, as mentioned above, is preferably in the region of 10 micro-meters. The outer surface of the layer 15, and the plane of the layer 12 are then both substantially flat and parallel to one another.

Figure 6:
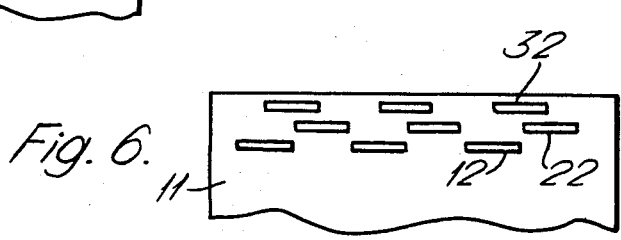
FIG. 6 is a cross sectional view of a second embodiment of the invention.

Referring now to FIG. 6, there is shown an alternative embodiment in which a plurality of layers 12, 22 and 32 have been formed in an element 11. This embodiment may be manufactured by a simple extension of the method described above for producing the embodiment of FIG. 1 simply by using the outer surface of the coating 15 as the starting surface similar to the starting surface 14 of FIG. 2 and repeating the method illustrated in FIGS. 3, 4 and 5 both for the layer 22 and for the layer 32. In this embodiment the distance between the layers 12 and 22 and between the layers 22 and 32 is less than the thickness of each layer since, in each case, the coating has been worked, as described with reference to FIG. 5, to an optical finish and to a thickness of the same order of magnitude as this distance above the preceding discrete embedded layer.

One of the advantages of embodiments of this invention is that the discontinuous and/or patterned layers can be formed in very close proximity to each other and to an external, optically figured surface. The whole assembly is also more robust and more suitable for further processing or application into a variety of optical systems than hitherto know devices.

Prior art methods for producing devices of a similar nature have involved the juxtaposing of two or more supported arrays of elements to form integers corresponding to the discontinuous and/or patterned layers, and these required fixing either by cementing or by mechanical means. The disadvantages of cementing are that the end product, by virtue of the physical properties of the cement, will not withstand the temperatures experienced in some further processing such as, for example vacuum-tight joining to other glass components as described above with respect to the formation of an embodiment of the invention as the end plate of a photo detection tube. Moreover, in general, cements are known to be less stable to physical effects produced by ultra-violet radiation or by environmental extremes of temperature and the like, than glass or the glass like materials which are suitable for use in embodiments of this invention.

On the other hand mechanical means for supporting the assembly are cumbersome and difficult to align. In addition the thickness of the supports necessary for this type of assembly cause an excessive separation of the superimposed thin film patterns and it is difficult to align such supports so that the planes of the layers are exactly parallel. It will be appreciated that this error can be considerably reduced in embodiments of this invention.

We claim:

1. An optical element of the type having zones selectively responsive to incident light, comprising
   a. a transparent substrate,
   b. a layer of material fixedly deposited on said substrate and of a material having selected optical properties differing from those of the substrate, said layer being deposited in a predetermined pattern to define zones selectively responsive to incident light, and said layer having a thickness not substantially exceeding 10 micro-meters,
   c. a coating applied directly onto said substrate and the layer deposited thereon in a thickness not substantially exceeding the thickness of the deposited layer, said coating forming a substantially integral structure with the substrate to seal the deposited layer within said structure and to form a substantially homogeneous light path through the element between the zones of the deposited layer.

2. An element according to claim 1, wherein said patterned layer defines reflective zones.

3. An element according to claim 1, wherein said patterned layer defines spectrally selective transmission zones.

4. An element according to claim 1, wherein said patterned layer defines light-absorbtion zones.

5. An element according to claim 1, wherein said patterned layer defines light-reactive zones.

6. An element according to claim 1, including
   d. at least one further patterned layer deposited on said coating, and
   e. at least one further coating covering said first coating carrying the further patterned layer.

7. An element according to claim 6, wherein said at least one further patterned layer consists of a material having optical properties differing from the first patterned layer.

* * * * *